US009152471B2

(12) United States Patent (10) Patent No.: US 9,152,471 B2
Duron et al. (45) Date of Patent: Oct. 6, 2015

(54) SYSTEM PERFORMANCE USING COOLING CONFIGURATION INFORMATION

(71) Applicant: International Business Machines Corporation, Armonk, NY (US)

(72) Inventors: Mike Conrad Duron, Austin, TX (US); Randall Clay Itskin, Austin, TX (US); Mark David McLaughlin, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 345 days.

(21) Appl. No.: 13/711,847

(22) Filed: Dec. 12, 2012

(65) Prior Publication Data

US 2014/0163766 A1 Jun. 12, 2014

(51) Int. Cl.
*G05D 23/19* (2006.01)
*G06F 9/50* (2006.01)

(52) U.S. Cl.
CPC .................................. *G06F 9/5083* (2013.01)

(58) Field of Classification Search
CPC .................................................. G06F 9/5083
USPC .................. 700/299, 300; 713/300, 320, 340
See application file for complete search history.

(56) References Cited

U.S. PATENT DOCUMENTS

| 7,156,316 | B2* | 1/2007 | Kates ............................. 236/1 B |
| 7,163,156 | B2* | 1/2007 | Kates ............................. 236/1 B |
| 7,165,412 | B1* | 1/2007 | Bean, Jr. ...................... 62/259.2 |
| 7,168,627 | B2* | 1/2007 | Kates ............................. 236/1 B |
| 7,272,732 | B2* | 9/2007 | Farkas et al. .................. 713/320 |
| 7,310,737 | B2* | 12/2007 | Patel et al. ..................... 713/300 |
| 7,313,503 | B2 | 12/2007 | Nakagawa et al. |
| 7,765,438 | B2 | 7/2010 | Haugh |
| 7,953,957 | B2 | 5/2011 | Gooding et al. |
| 8,219,362 | B2 | 7/2012 | Shrivastava et al. |
| 8,224,639 | B2* | 7/2012 | Inoue .............................. 703/18 |
| 8,237,386 | B2* | 8/2012 | Culbert et al. ................ 318/471 |
| 8,448,000 | B2* | 5/2013 | Culbert et al. ................ 713/320 |
| 8,751,212 | B2* | 6/2014 | Inoue .............................. 703/18 |
| 2004/0054938 | A1 | 3/2004 | Belady et al. |
| 2004/0264124 | A1* | 12/2004 | Patel et al. ..................... 361/686 |
| 2004/0268166 | A1* | 12/2004 | Farkas et al. .................. 713/320 |
| 2005/0216222 | A1* | 9/2005 | Inoue ............................ 702/136 |
| 2011/0161968 | A1 | 6/2011 | Bash et al. |
| 2012/0266174 | A1 | 10/2012 | Inoue |

OTHER PUBLICATIONS

Ayoub et al; Cool and Save: Cooling Aware Dynamic Workload Scheduling in Multi-socket CPU Systems, Jan. 18, 2010.

* cited by examiner

*Primary Examiner* — Charles Kasenge
(74) *Attorney, Agent, or Firm* — Garg Law Firm, PLLC; Rakesh Garg; Parashos T. Kalaitzis

(57) ABSTRACT

A method, system, and computer program product for improving system performance using cooling configuration information are provided in the illustrative embodiments. A set of components in a data processing system is indexed according to corresponding amounts of cooling available to the components in the set. Priorities are assigned to component users in a set of component users. Using a processor and a memory, a component whose index value represents a higher than threshold amount of cooling availability to the component is allocated to a component user whose priority is higher than a threshold priority.

18 Claims, 6 Drawing Sheets

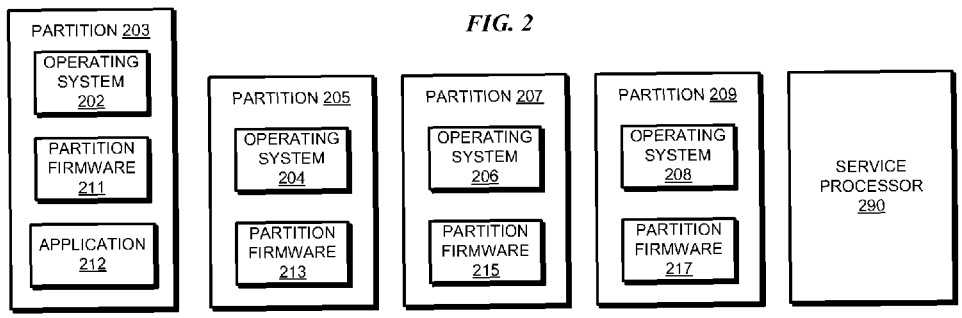
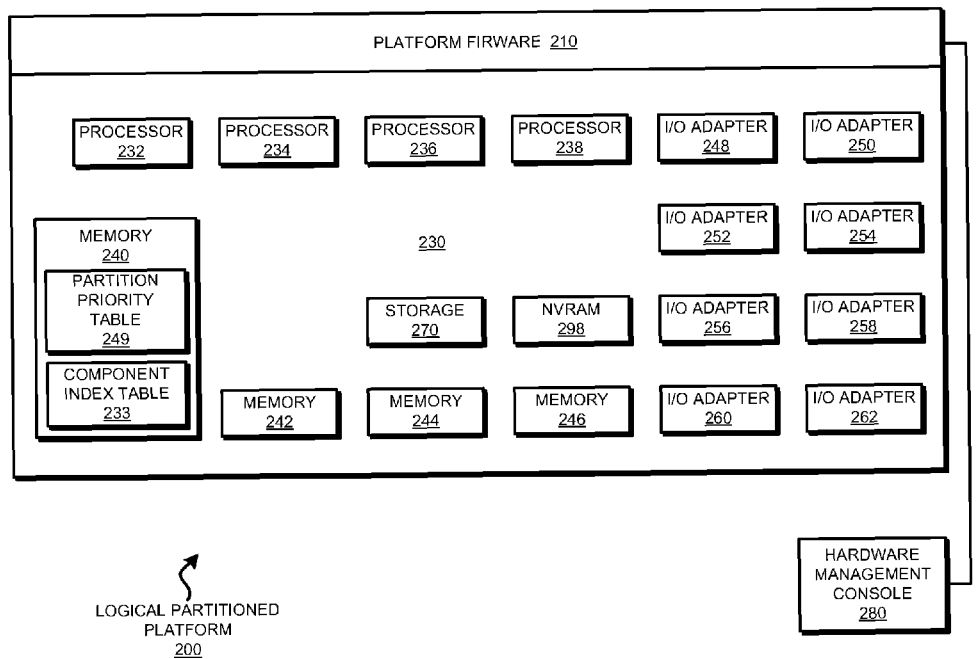
FIG. 2

SYSTEM PERFORMANCE USING COOLING CONFIGURATION INFORMATION

BACKGROUND

1. Technical Field

The present invention relates generally to a method, system, and computer program product for improving performance of a data processing system component. More particularly, the present invention relates to a method, system, and computer program product for improving system performance using cooling configuration information of the system components.

2. Description of the Related Art

Data processing systems can be configured in a variety of ways. For example, the components in a data processing system may be configured to operate in a manner such that the data processing system behaves as a single data processing unit. The memory in such a configuration operates to support data manipulation for the single data processing unit.

As another example, data processing systems can be divided into logical partitions (LPARs). Such data processing systems are also known as logical partitioned data processing systems. A logical partition is also known simply as a "partition." Each partition operates as a separate data processing system independent of the other partitions. Generally, a partition management firmware component manages partitions through their creation and subsequent assignment of hardware components. A Hypervisor is an example of such partition management firmware.

Electronic components in a data processing system produce heat as a byproduct of their operation. Typically, the heat is dissipated from the data processing system using a cooling medium, such as air or a liquid coolant (collectively referred to as "coolant").

SUMMARY

The illustrative embodiments provide a method, system, and computer program product for improving system performance using cooling configuration information. An embodiment indexes a set of components in a data processing system according to corresponding amounts of cooling available to the components in the set. The embodiment assigns priorities to component users in a set of component users. The embodiment allocates, using a processor and a memory, a component whose index value represents a higher than threshold amount of cooling availability to the component to a component user whose priority is higher than a threshold priority.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 depicts a block diagram of an example logically partitioned platform in which the illustrative embodiments may be implemented;

DETAILED DESCRIPTION

Figure 1:
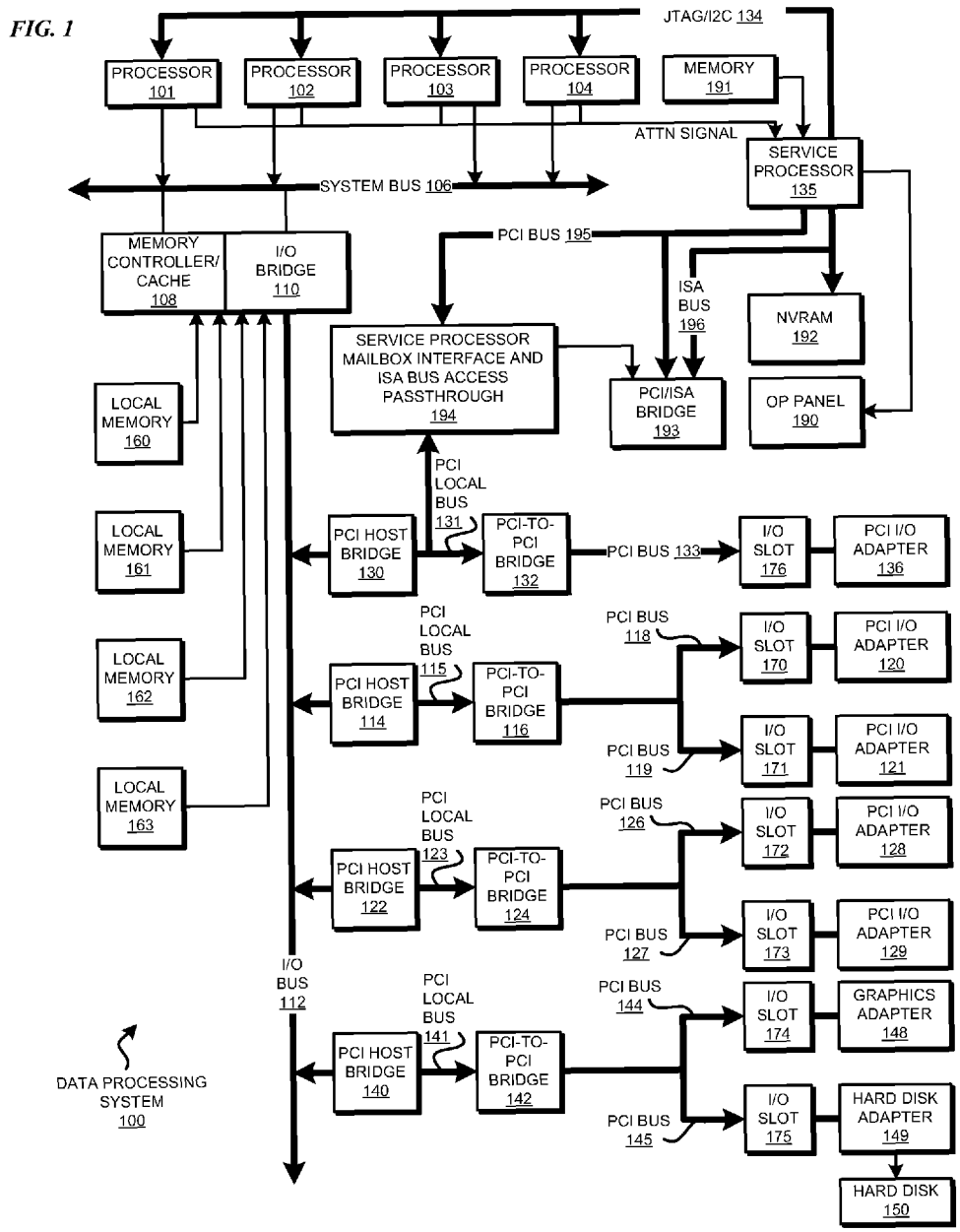
FIG. 1 depicts a block diagram of a data processing system in which the illustrative embodiments may be implemented.

Within the scope of this disclosure, a component of a data processing system can be any electrical or electronic component, such as, for example, a memory card, a processor chip, a controller board, an adapter, or a power supply. The illustrative embodiments recognize that the performance of a component depends on the effectiveness of heat removal from the component. A relatively cooler component can be configured to perform better than a relatively hotter component of a similar type.

Consider air as an example coolant. The illustrative embodiments recognize that the location of a component in the airflow path through a data processing system is a factor in determining how effectively the airflow can remove heat from that component. A component that is closest to the airflow inlet receives the best heat exchange rate from the airflow and will be cooled the most. As the air passes over components progressively farther from the inlet, the air is increasingly heated, and the farther components receive progressively decreasing heat exchange rate from the airflow. Thus, the illustrative embodiments recognize that in a component closer to the coolant inlet performs or can be configured to perform better than a comparable component farther away from the coolant inlet.

For example, a processor closer to an airflow inlet can be operated at a clock speed higher than the clock speed of a comparable processor farther away from the inlet in relation to the first processor. A processor operating at a relatively higher clock speed can process larger workloads than another comparable processor operating at a relatively lower clock speed.

Presently, in a multi-partition system with a controlling hypervisor, the hardware component assignment to partitions is done without considering chip location. Presently, the components are numbered by firmware and the first available component from a set of comparable components is assigned to the partition.

Sometimes a system assigns certain components together as a group. For example, a group of processors may be assigned to a partition together in order to maintain system affinity for processors that are on the same chip or are otherwise closely tied together.

The illustrative embodiments recognize that present component assignment techniques do not consider the cooling configurations of the various components when making assignments of partition resources. Thus, the illustrative embodiments recognize that at least some assignments of components to partitions are not optimal for partition performance, overall system performance, or both, in a given system configuration.

A cooling configuration of a component includes the positioning of the component relative to a coolant flow, obstructions affecting the coolant flow to the component, or a combination thereof. Information about a cooling configuration describes such positioning, obstructions, or a combination thereof.

The illustrative embodiments used to describe the invention generally address and solve the above-described problems and other problems related to system performance due to hardware component cooling configurations. The illustrative embodiments provide a method, system, and computer program product for improving system performance using cooling configuration information.

For example, an embodiment uses knowledge about the coolant flow through a system to make cooling configuration aware component assignments to partitions or workloads in a system. Another embodiment further uses priority information associated with component users, such as partitions or workloads, to optimally assign components to the components users such that the performance of the component user or system as a whole is improved. In one example operation, such an embodiment assigns the coolest component to the highest priority partition, thereby allowing that partition to achieve better performance as compared to the partition's performance with a hotter component.

Another embodiment can help reduce the operating costs of a system by using the cooling configuration information about the components of the system. For example, some systems have energy savings capabilities where a component can be powered down, placed in a low power consumption mode, or placed in a sleep mode when the component's utilization falls below a threshold utilization. An embodiment reconfigures a relatively cooler component to handle additional workloads. The embodiment transfers a workload from a relatively hotter component to the relatively cooler component, thereby reducing the hotter component's utilization. When the embodiment has caused the hotter component's utilization to fall below the threshold level of utilization, the embodiment allows the system to reduce the power consumption of the hotter component, thereby reducing the operating cost of the system.

Some systems incur license costs per component that uses a license for the component's operation. In such configurations, another embodiment reduces the operating costs of the system by reducing the number of components using the licenses. The embodiment transfers the workload of a relatively hotter component to a relatively cooler component. When the workload is transferred away and the hotter component is no longer using the license, the embodiment allows the system to reduce the license usage and license cost of operating the system is reduced.

The illustrative embodiments are described with respect to certain components, component users, costs, and performance measurement criteria only as examples. Such examples are not intended to be limiting to the invention. For example, an illustrative embodiment described with respect to a processor component can be implemented with respect to a memory component in a similar manner within the scope of the illustrative embodiments. As another example, an illustrative embodiment described with respect to a partition can be used with respect to a workload in a non-partitioned system in a similar manner within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a data processing system in which the illustrative embodiments may be implemented. Data processing system 100 may be a symmetric multiprocessor (SMP) system including a plurality of processors 101, 102, 103, and 104, which connect to system bus 106. For example, data processing system 100 may be an IBM Power System® implemented as a server within a network. (Power Systems is a product and a trademark of International Business Machines Corporation in the United States and other countries). Alternatively, a single processor system may be employed and processors 101, 102, 103, and 104 may be cores in the single processor chip. Alternatively, data processing system 100 may include processors 101, 102, 103, 104 in any combination of processors and cores.

Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects to a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to one of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX®) operating system may be executing within partition P1, a second instance (image) of the AIX operating system may be executing within partition P2, and a Linux® or IBM-i® operating system may be operating within logical partition P3. (AIX and IBM-i are trademarks of International business Machines Corporation in the United States and other countries. Linux is a trademark of Linus Torvalds in the United States and other countries).

Peripheral component interconnect (PCI) host bridge 114 connected to I/O bus 112 provides an interface to PCI local bus 115. A number of PCI input/output adapters 120-121 connect to PCI local bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI local bus 123. PCI local bus 123 connects to a plurality of PCI I/O adapters 128-129. PCI I/O adapters 128-129 connect to PCI local bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

Memory mapped graphics adapter 148 is inserted into I/O slot 174 and connects to I/O bus 112 through PCI bus 144, PCI-to-PCI bridge 142, PCI local bus 141, and PCI host bridge 140. Hard disk adapter 149 may be placed into I/O slot 175, which connects to PCI bus 145. In turn, PCI bus 145 connects to PCI-to-PCI bridge 142, which connects to PCI host bridge 140 by PCI local bus 141.

A PCI host bridge 130 provides an interface for a PCI local bus 131 to connect to I/O bus 112. PCI I/O adapter 136 connects to I/O slot 176, which connects to PCI-to-PCI bridge 132 by PCI bus 133. PCI-to-PCI bridge 132 connects to PCI local bus 131. PCI local bus 131 also connects PCI host bridge 130 to service processor mailbox interface and ISA bus access pass-through logic 194 and PCI-to-PCI bridge 132.

Service processor mailbox interface and ISA bus access pass-through logic 194 forwards PCI accesses destined to PCI/ISA bridge 193. NVRAM storage 192 connects to ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/scan busses (see IEEE 1149.1) and Phillips I2C busses.

However, alternatively, JTAG/I2C busses 134 may be replaced by only Phillips I2C busses or only JTAG/scan busses. All SP-ATTN signals of the host processors 101, 102, 103, and 104 connect together to an interrupt input signal of service processor 135. Service processor 135 has its own local memory 191 and has access to hardware OP-panel 190.

When data processing system 100 is initially powered up, service processor 135 uses the JTAG/I2C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Service processor 135 gathers and reports any error information for failures detected during the BISTs, BATs, and memory tests.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. Service processor 135 monitors types of items including, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap."

Data processing system 100 may be implemented using various commercially available computer systems. For example, data processing system 100 may be implemented using IBM Power Systems available from International Business Machines Corporation. Such a system may support logical partitioning using an AIX operating system, which is also available from International Business Machines Corporation.

Memories, such as memory 191, NVRAM 192, local memories 160, 161, 162, and 163, or flash memory (not shown), are some examples of computer usable storage devices. Hard disk 150, a CD-ROM (not shown), and other similarly usable devices are some examples of computer usable storage devices including computer usable storage medium.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments.

With reference to FIG. 2, this figure depicts a block diagram of an example logically partitioned platform in which the illustrative embodiments may be implemented. The hardware in logically partitioned platform 200 may be implemented as, for example, the corresponding components depicted in data processing system 100 in FIG. 1.

Logically partitioned platform 200 includes partitioned hardware 230, operating systems 202, 204, 206, 208, and platform firmware 210. A platform firmware, such as platform firmware 210, is also known as partition management firmware. Operating systems 202, 204, 206, and 208 may be multiple copies of a single operating system or multiple heterogeneous operating systems simultaneously run on logically partitioned platform 200. These operating systems may be implemented using IBM-i, which is designed to interface with a partition management firmware, such as Hypervisor. IBM-i is used only as an example in these illustrative embodiments. Of course, other types of operating systems, such as AIX and Linux, may be used depending on the particular implementation. Operating systems 202, 204, 206, and 208 are located in partitions 203, 205, 207, and 209, respectively.

Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, partitions 203, 205, 207, and 209 also include partition firmware 211, 213, 215, and 217, respectively. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, platform firmware 210 loads a copy of boot strap code onto partitions 203, 205, 207, and 209. Thereafter, control is transferred to the boot strap code with the boot strap code then loading the open firmware and RTAS. The processors associated or assigned to the partitions are then dispatched to the partition's memory to execute the partition firmware.

A data processing system, for example, partition 203, includes application 212. Application 212 comprises program instructions for carrying out the processes of any of the various embodiments. The program instructions may be stored on at least one of one or more computer-readable tangible storage devices (e.g., hard disk 150, NVRAM 192, or a compact disk device coupled with I/O bus 112 in FIG. 1), for execution by at least one of one or more processors (e.g., processors 101-104 in FIG. 1) via at least one of one or more computer-readable memories (e.g., any of local memories 160-163 in FIG. 1). Application 212 may be implemented in any form, including but not limited to a form suitable for execution as a service, a form implemented using hardware and software, or a form suitable for integration with another application. A component, for example, memory 240, includes component index table 233 and partition priority table 249 according to an embodiment.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of partitions 203, 205, 207, and 209 within logically partitioned platform 200, each of which partitions 203, 205, 207, and 209 corresponds to one of operating systems 202, 204, 206, and 208.

Partition management firmware 210 performs a number of functions and services for partitions 203, 205, 207, and 209 to create and enforce the partitioning of logically partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logically partitioned platform 200.

Service processor 290 may be used to provide various services, such as processing of platform errors in the partitions. These services also may act as a service agent to report errors back to a vendor, such as International Business Machines Corporation. Operations of partitions 203, 205, 207, and 209 may be controlled through a hardware management console, such as hardware management console 280. Hardware management console 280 is a separate data processing system from which a system administrator may perform various functions including reallocation of resources to different partitions.

The hardware in FIGS. 1-2 may vary depending on the implementation. Other internal hardware or peripheral devices, such as flash memory, equivalent non-volatile memory, or optical disk drives and the like, may be used in addition to or in place of certain hardware depicted in FIGS. 1-2. An implementation of the illustrative embodiments may also use alternative architecture for managing partitions without departing from the scope of the invention.

Figure 3:
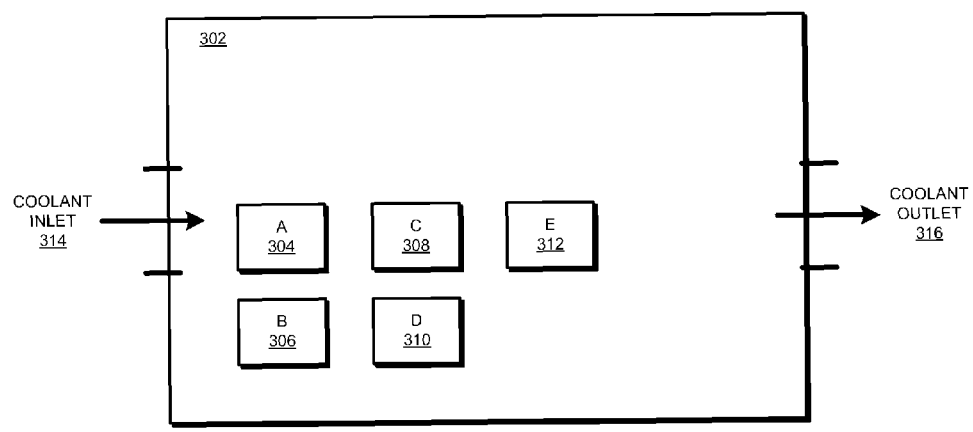
FIG. 3 depicts a block diagram of an example cooling configuration in a data processing system, the information about which can be used in accordance with an illustrative embodiment.

With reference to FIG. 3, this figure depicts a block diagram of an example cooling configuration in a data processing system, the information about which can be used in accordance with an illustrative embodiment. Data processing system 302 is an example data processing system using all or part of data processing system 100 in FIG. 1. Components 304, 306, 308, 310, and 312 are labeled with example identifiers A, B, C, D, and E, respectively. Components 304, 306, 308, 310, and 312 are any number of hardware components, for example, corresponding to any number of processors similar to processor 101 in FIG. 1, or any number of local memory 161 in FIG. 1.

Coolant inlet 314 allows a suitable coolant to enter system 302 for removing heat from components 304-312. Coolant outlet 316 allows the coolant to exit system 302 after removing heat from components 304-312.

In the example placement of components 304-312 depicted in this figure, component 304 is positioned closest to coolant inlet 314, and component 312 is positioned the farthest from coolant inlet 314. Accordingly, component 304's cooling configuration allows component 304 to receive the most cooling, and component 312's cooling configuration allows component 312 to receive the least cooling from the coolant flow between cooling inlet 314 and cooling outlet 316. Components 306, 308, and 310 receive progressively reduced cooling from the coolant flow between cooling inlet 314 and cooling outlet 316 owing to their progressively distant cooling configurations from cooling inlet 314.

An embodiment uses the information about the cooling configurations of components 304-312 to assign components 304-312 to partitions or workloads to improve performance of partitions or workloads according to their relative priorities. An embodiment uses the information about the cooling configurations of components 304-312 to reduce the use of relatively hotter components, such as components 310 or 312, and increase the use of relatively cooler components, such as components 304 or 306.

As an example, an embodiment can reduce the utilization of component 312 such that system 302 can place component 312 in a low power consumption mode, thereby reducing energy-related operating costs of system 302. As another example, an embodiment can reduce the utilization of component 312 such that system 302 can remove a license from use at component 312, thereby reducing license-related operating costs of system 302.

Figure 4:
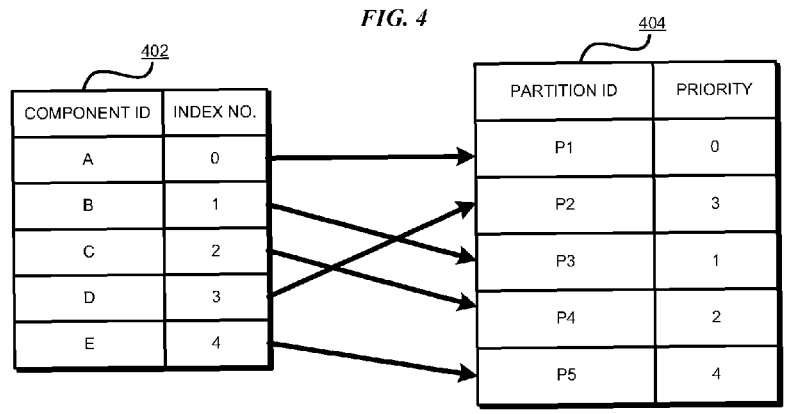
FIG. 4 depicts example data structures configured for improving system performance using cooling configuration information in accordance with an illustrative embodiment.

With reference to FIG. 4, this figure depicts example data structures configured for improving system performance using cooling configuration information in accordance with an illustrative embodiment. Component index table 402 is an example of component index table 233 in FIG. 2. Partition priority table 404 is an example of partition priority table 249 in FIG. 2.

Data structures 402 and 404 are described as tables only as examples and not as a limitation on the illustrative embodiments. An implementation can use any suitable data structure for achieving a similar result, and such other data structures are contemplated within the scope of the illustrative embodiments.

Table 404 is described as a "partition priority" table only as an example and not as a limitation on the illustrative embodiments. Any component user, such as a workload in a non-partitioned data processing system, can be prioritized in a similar manner and other component users are contemplated within the scope of the illustrative embodiments.

Table 402 is configured to store cooling configuration information about a set of functionally interchangeable components, or similar components, such as components 304-312 in FIG. 3. Any number of table 402 can be created to store similar information about any number of sets of similar components.

In an example embodiment, components in a set are indexed according to an amount of cooling they receive, for example, by their relative proximity to a coolant inlet coolant inlet 314 in FIG. 3. Only as an example, a first component receives a lower index value compared to a second component if the first component receives more cooling, or better heat exchange, than the second component.

Using the configuration depicted in FIG. 3, table 402 is populated with the identifiers of the components in the set of components represented in table 402, and the components' indices. For example, component A is depicted to have an index 0, component B an index value of 1, component C an index value of 2, component D an index value of 3, and component E an index value of 4, based on their relative heat exchange effectiveness in the configuration of FIG. 3.

These indices suggest that component A receives the best cooling in the set of components A-E, and component E receives the least cooling in the same set. Using this cooling configuration information, one embodiment can reconfigure components A-E for handling different amounts of workload without stressing the components beyond their operational limits. For example, an embodiment increases the clock speed of component A more than the clock speed of components B-D, and leaves the clock speed of component E unchanged. In such a reconfiguration, component A can now process a greater workload than components B, C, D, or E, while maintaining comparable operating temperatures with components B, C, D, or E.

Using partitions as example users of components A-E, assume that any component from the set of components in table 402 can be assigned to any partition P1, P2, P3, P4, or P5, depicted in table 404. Table 404 is populated with a priority value corresponding to each component user. For example, for some reason, partition P1 is designated the highest priority partition with priority 0, followed by P3 as the next highest priority with priority 1, followed by P4 as the next highest priority with priority 2, followed by P2 as the next highest priority with priority 3, and followed by P5 as the lowest priority with priority 4.

An embodiment implemented in an application, such as in application 212 in FIG. 2, assigns the components from the set represented in table 402 to a component user represented in table 404 such that a component user with a relatively higher priority than another component user in table 404 is assigned a component with relatively better cooling than another component from table 402. Accordingly, in the depicted example, an embodiment assigns component A to partition P1, component B to partition P3, component C to partition P4, component D to partition P2, and component E to partition P5.

Furthermore, these assignments are dynamic. An embodiment can change the assignments if components are added or removed from table 402, or a component's cooling configuration changes, such as by becoming obstructed. An embodiment can also change the assignments if a component user is added or removed from table 404, or the priority associated with a component user changes.

An embodiment can further alter the assignments if an operating cost reduction can be achieved. For example, after the assignments depicted in FIG. 4, an embodiment may determine that partition P5 is utilizing component E below a threshold amount, and that amount of capacity is available in component B such that partitions P3 and P5 can share component B, reduce the utilization of component E below another threshold such that component E can be placed in a low power consumption mode.

As another example, after the assignments depicted in FIG. 4, an embodiment may determine that partition P5 is utilizing a license at component E below a threshold amount, and that amount of license capacity is available in component B such that partitions P3 and P5 can share a license at component B, reduce the license utilization of component E such that the license can be removed from component E.

Figure 5:
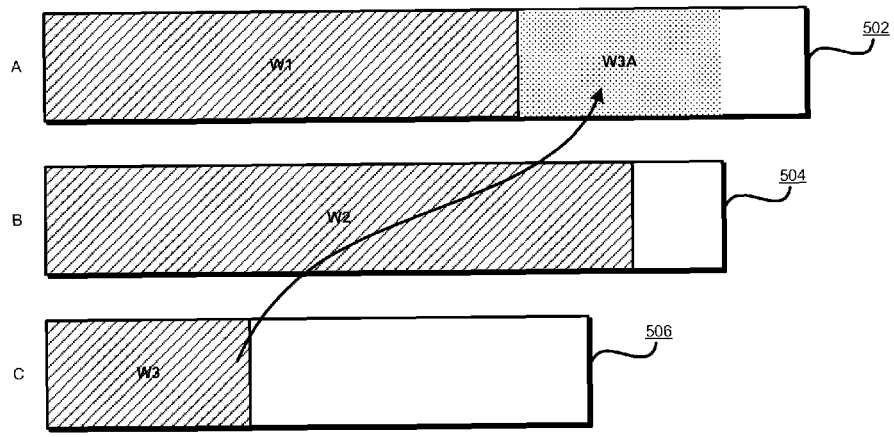
FIG. 5 depicts a block diagram of an example process for improving system performance using cooling configuration information in accordance with an illustrative embodiment.

With reference to FIG. 5, this figure depicts a block diagram of an example process for improving system performance using cooling configuration information in accordance with an illustrative embodiment. Blocks 502, 504, and 506 represent the utilization of components A, B, and C respectively, from table 402 in FIG. 4.

An embodiment can further alter the assignments described with respect to FIG. 4. For example, assume that after the assignments depicted in FIG. 4, an embodiment determines that utilization 502 of component A is at level W1; utilization 504 of component B is at level W2; and utilization 506 of component C is only at level W3. The embodiment further determines that the amount of workload processed by component C can be accommodated in the spare capacity of component A.

Accordingly, the embodiment transfers the one or more workloads using component C to component A, increasing the utilization of component A by corresponding amount W3A, and removing the utilization W3 from utilization 506. Now, the embodiment can instruct, direct, or enable a system to switch component C to a low power mode, thereby improving the performance of the system by reducing the cost of executing the same amount of workload but with less energy.

Blocks 502, 504, and 506 and the artifacts depicted therein can also be interpreted as license usage. An embodiment can similarly instruct, direct, or enable a system to transfer license usage from component C to component A in a similar manner, and remove a license from component C. Thus, an embodiment improves the performance of the system by reducing the cost of executing the same amount of workload but with fewer licenses.

Figure 6:
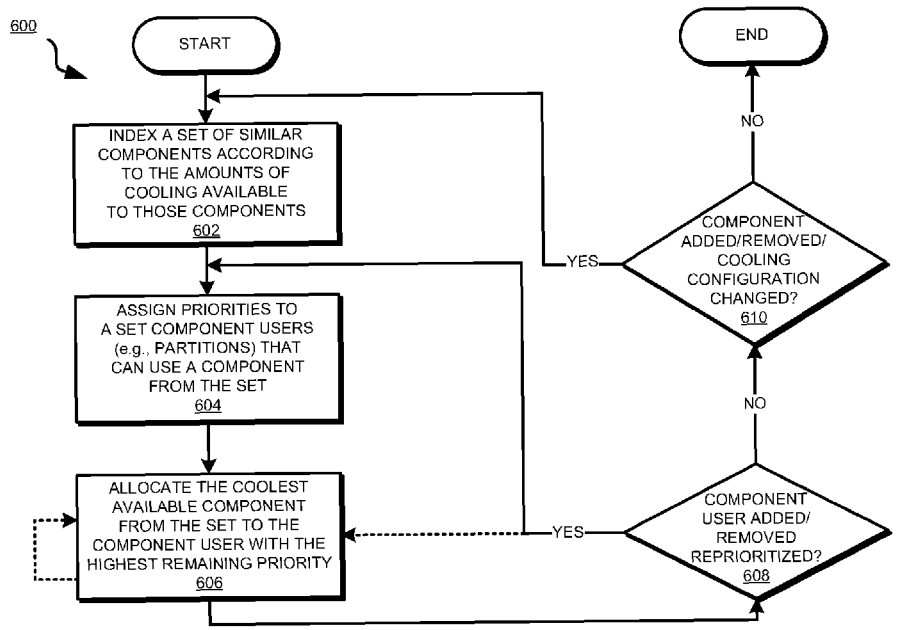
FIG. 6 depicts a flowchart of a process for improving system performance using cooling configuration information in accordance with an illustrative embodiment.

With reference to FIG. 6, this figure depicts a flowchart of a process for improving system performance using cooling configuration information in accordance with an illustrative embodiment. Process 600 can be implemented in application 212 in FIG. 2.

Process 600 begins by indexing a set of similar components according to the amounts of cooling available to those components (step 602). Process 600 assigns priorities to a set of component users, for example, partitions, that can use one or more components from the set of components (step 604).

Process 600 allocates the coolest available component from the set of components to the component user with the highest remaining priority in the set of component users (step 606). Process 600 repeats step 606 so long as a component user in the set of component users remains in need of a component from the set of components.

Process 600 determines whether a component user has been added, removed, or reprioritized (step 608). If a component user has been added or removed, (solid branch of "Yes" path of step 608), process 600 returns to step 604. If a component user has been reprioritized, (dotted branch of "Yes" path of step 608), process 600 returns to step 606. If the set of component users has remained unchanged ("No" path of step 608), process 600 determines whether a component has been added or removed from the set of components, or the cooling configuration of a component in the set of components has changed (step 610). If a component has been added or removed from the set of components, or the cooling configuration of a component in the set of components has changed ("Yes" path of step 610), process 600 returns to step 602. If the set of components remains unchanged ("No" path of step 610), process 600 may end thereafter.

Figure 7:
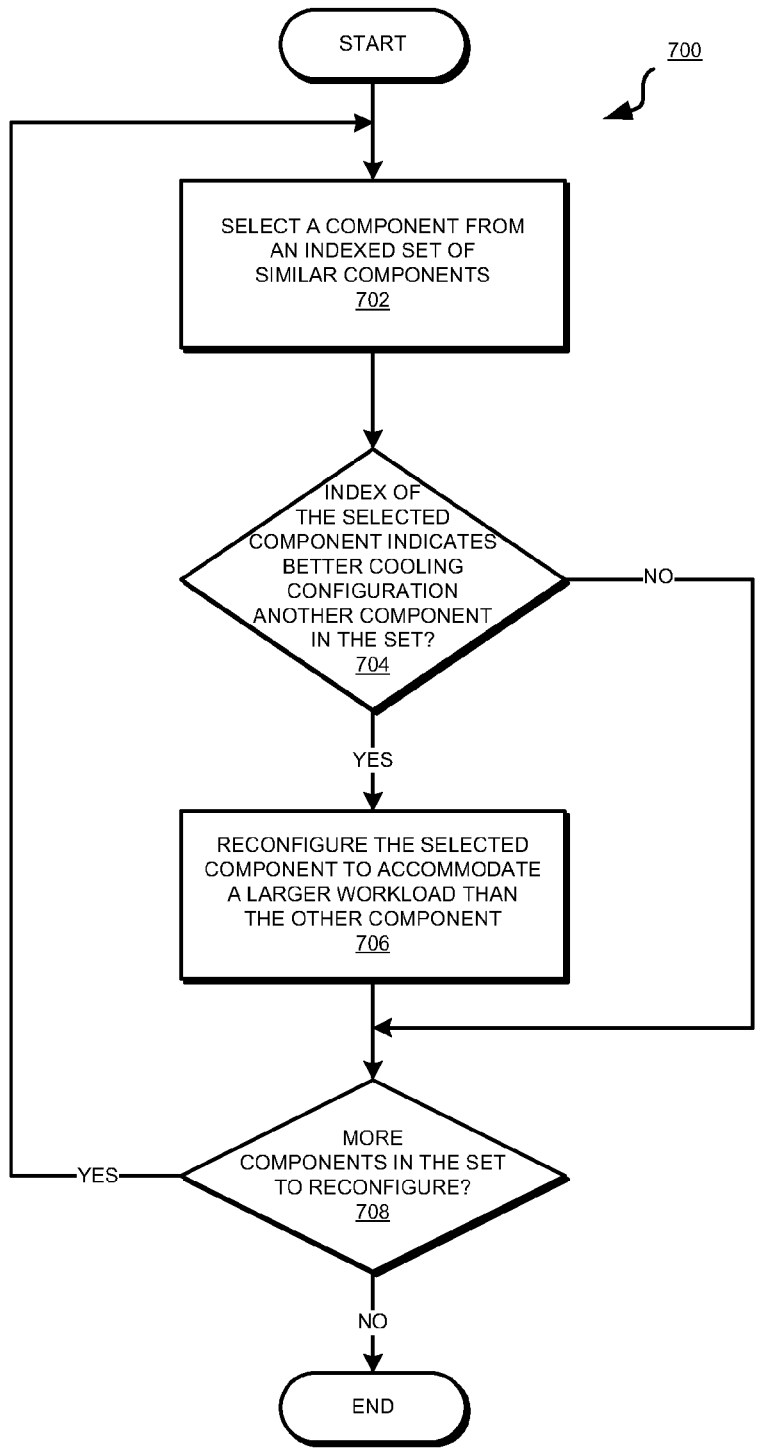
FIG. 7 depicts a flowchart of an example process of reconfiguring a component for improving system performance using cooling configuration information in accordance with an illustrative embodiment.

With reference to FIG. 7, this figure depicts a flowchart of an example process of reconfiguring a component for improving system performance using cooling configuration information in accordance with an illustrative embodiment. Process 700 can be implemented in application 212 in FIG. 2.

Process 700 begins by selecting a component from an indexed set of components, such as the set of components in table 402 in FIG. 4 that may result after step 602 in FIG. 6 (step 702). Process 700 determines whether the index of the selected component indicates that the selected component has a better cooling configuration than another component in the set of components (step 704). If the selected component has the better cooling configuration ("Yes" path of step 704), process 700 reconfigures the selected component to have improved performance, such as the ability to accommodate a larger workload than the other component, e.g., by increasing the clock speed of the selected component more than the clock speed of the other component (step 706). If the selected component does not have the better cooling configuration ("No" path of step 704), process 700 proceeds to step 708.

Process 700 determines whether more components remain in the set of components for similar reconfiguration (step 708). If more components remain ("Yes" path of step 708), process 700 returns to step 702 and selects another component. If no more components remain ("No" path of step 708), process 700 may end thereafter.

Figure 8:
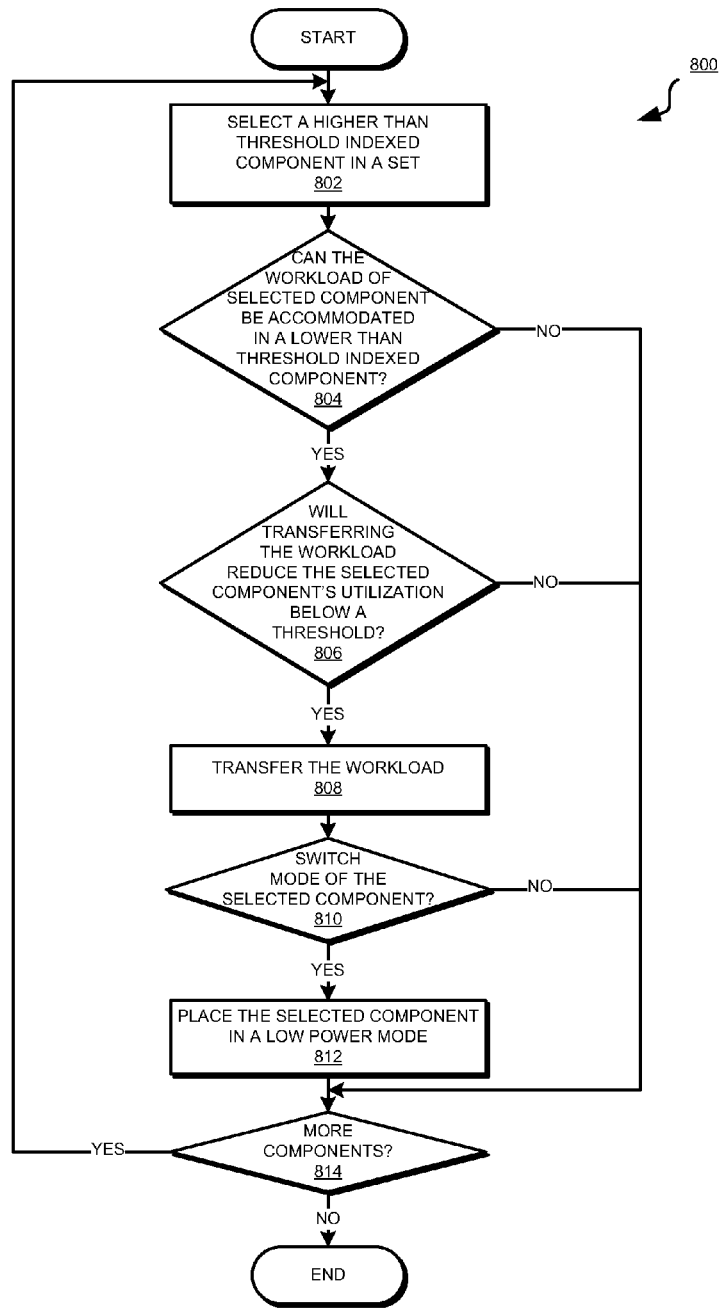
FIG. 8 depicts a flowchart of an example process for reducing operating cost and improving system performance using cooling configuration information in accordance with an illustrative embodiment.

With reference to FIG. 8, this figure depicts a flowchart of an example process for reducing operating cost and improving system performance using cooling configuration information in accordance with an illustrative embodiment. Process 800 can be implemented in application 212 in FIG. 2. In FIG. 4 and in process 800, lower thresholds are indicative of better cooling configuration only as an example for the ease of conveying the operation of an embodiment. An implementation may elect to use higher index values to indicate better cooling configuration in a similar manner within the scope of the illustrative embodiments. Other manners of associating the index values to the levels of cooling available at a component, such as symbolic or encoded indices, are also contemplated within the scope of the illustrative embodiments.

Process 800 begins by selecting from an indexed set of components a component whose index is higher than a threshold index (step 802). Process 800 determines whether the workload of the selected component be accommodated in a lower than threshold indexed component in the set (step 804). If the workload of the selected component be accommodated in a lower than threshold indexed component in the set ("Yes" path of step 804, process 800 determines whether transferring the workload reduce the selected component's utilization below a threshold level of utilization (step 806).

If transferring the workload will reduce the selected component's utilization below a threshold level of utilization ("Yes" path of step 806), process 800 transfers the workload to the lower than threshold indexed component in the set considered in step 804 (step 808).

Process 800 determines whether a mode of the selected component can be switched to a low power consumption mode (step 810). If the mode can be switched ("Yes" path of step 810), process 800 places the selected component in a low power mode (step 812).

If the determinations of steps 804, 806, or 810 result in a negative answer ("No" path of step 804), ("No" path of step 806), or ("No" path of step 810), process 800 proceeds to step 814. Process 800 determines whether more components remain to be considered in the set of components for switching to low power mode (step 814). If more components remain to be considered ("Yes" path of step 814), process 800 returns to step 802. If no more components are to be considered ("No" path of step 814), process 800 may end thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for improving system performance using cooling configuration information. Using an embodiment, the performance of a data processing system can be improved by judiciously assigning components with better cooling configurations than others to component users with higher priorities than others. An embodiment further allows operating components with better cooling configurations to handle increased workloads, thus freeing up components to further improve system performance.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer implemented method for improving system performance using cooling configuration information, the method comprising:
    indexing a set of components in a data processing system according to corresponding amounts of cooling available to the components in the set, wherein an amount of cooling available to a component in the set of components is dependent upon a cooling configuration of the component in the data processing system, and wherein the cooling configuration includes a measure of a proximity of the component to a coolant inlet in the data processing system;
    assigning priorities to component users in a set of component users; and
    allocating, using a processor and a memory, a component whose index value represents a higher than threshold amount of cooling availability to the component to a component user whose priority is higher than a threshold priority.

2. The method of claim 1, further comprising:
    selecting a first component whose index value is indicative of better cooling configuration than a cooling configuration of a second component in the set of components; and
    reconfiguring the first component to deliver a better performance than the second component.

3. The method of claim 2, wherein the reconfiguring comprises:
    increasing a clock speed of the first component to more than a clock speed of the second component.

4. The method of claim 2, further comprising:
    transferring a workload from the second component to the first component; and
    placing the second component in a low power consumption mode.

5. The method of claim 4, further comprising:
    evaluating whether the workload from the second component can be transferred to the first component; and
    analyzing whether the transferring will allow the second component to be placed in the low power consumption mode, wherein the transferring and the placing being responsive to the evaluating and the analyzing being affirmative.

6. The method of claim 2, further comprising:
    transferring a workload from the second component to the first component; and
    removing a license from use in the second component, wherein the license was used to execute the workload at the second component.

7. The method of claim 1, wherein a priority assigned to a component user in the set of component users is indicative of a relative importance of the component user in the set of component users.

8. The method of claim 1, wherein the components in the set of components are functionally similar to one another.

9. The method of claim 1, wherein the component users in the set of component users are partitions in the data processing system.

10. The method of claim 1, wherein the components in the set of components are processors in the data processing system.

11. A computer usable program product comprising a computer usable storage device including computer usable code for improving system performance using cooling configuration information, the computer usable code comprising:
    computer usable code for indexing a set of components in a data processing system according to corresponding amounts of cooling available to the components in the set, wherein an amount of cooling available to a component in the set of components is dependent upon a cooling configuration of the component in the data processing system, and wherein the cooling configuration includes a measure of a proximity of the component to a coolant inlet in the data processing system;
    computer usable code for assigning priorities to component users in a set of component users; and
    computer usable code for allocating, using a processor and a memory, a component whose index value represents a higher than threshold amount of cooling availability to the component to a component user whose priority is higher than a threshold priority.

12. The computer usable program product of claim 11, further comprising:
    computer usable code for selecting a first component whose index value is indicative of better cooling configuration than a cooling configuration of a second component in the set of components; and
    computer usable code for reconfiguring the first component to deliver a better performance than the second component.

13. The computer usable program product of claim 12, wherein the reconfiguring comprises:
    computer usable code for increasing a clock speed of the first component to more than a clock speed of the second component.

14. The computer usable program product of claim 12, further comprising:
    computer usable code for transferring a workload from the second component to the first component; and
    computer usable code for placing the second component in a low power consumption mode.

15. The computer usable program product of claim 14, further comprising:
    computer usable code for evaluating whether the workload from the second component can be transferred to the first component; and
    computer usable code for analyzing whether the transferring will allow the second component to be placed in the low power consumption mode, wherein the transferring and the placing being responsive to the evaluating and the analyzing being affirmative.

16. The computer usable program product of claim 11, wherein the computer usable code is stored in a computer readable storage medium in a data processing system, and wherein the computer usable code is transferred over a network from a remote data processing system.

17. The computer usable program product of claim 11, wherein the computer usable code is stored in a computer readable storage medium in a server data processing system, and wherein the computer usable code is downloaded over a network to a remote data processing system for use in a computer readable storage medium associated with the remote data processing system.

18. A data processing system for improving system performance using cooling configuration information, the data processing system comprising:
- a storage device including a storage medium, wherein the storage device stores computer usable program code; and
- a processor, wherein the processor executes the computer usable program code, and wherein the computer usable program code comprises:
- computer usable code for indexing a set of components in a data processing system according to corresponding amounts of cooling available to the components in the set, wherein an amount of cooling available to a component in the set of components is dependent upon a cooling configuration of the component in the data processing system, and wherein the cooling configuration includes a measure of a proximity of the component to a coolant inlet in the data processing system;
- computer usable code for assigning priorities to component users in a set of component users; and
- computer usable code for allocating, using a processor and a memory, a component whose index value represents a higher than threshold amount of cooling availability to the component to a component user whose priority is higher than a threshold priority.

* * * * *